US 8,795,113 B2

(12) United States Patent
Grochowski et al.

(10) Patent No.: US 8,795,113 B2
(45) Date of Patent: Aug. 5, 2014

(54) HYBRID POWERTRAIN FOR A MOTOR VEHICLE

(75) Inventors: Edwin T. Grochowski, Howell, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 112 days.

(21) Appl. No.: 13/348,757

(22) Filed: Jan. 12, 2012

(65) Prior Publication Data
US 2012/0178569 A1 Jul. 12, 2012

Related U.S. Application Data

(60) Provisional application No. 61/432,139, filed on Jan. 12, 2011.

(51) Int. Cl.
*F16H 3/62* (2006.01)
*F16H 3/72* (2006.01)
*B60K 6/383* (2007.10)
*F16H 3/66* (2006.01)
*B60K 6/48* (2007.10)

(52) U.S. Cl.
CPC .......... *F16H 3/66* (2013.01); *B60K 2006/4825* (2013.01); *Y02T 10/6252* (2013.01); *F16H 2200/201* (2013.01); *B60K 6/383* (2013.01); *F16H 2200/0052* (2013.01); *B60K 6/48* (2013.01); *F16H 2200/2082* (2013.01); *F16H 2200/2043* (2013.01); *Y02T 10/6221* (2013.01)
USPC ................... 475/5; 475/8; 475/278; 475/330

(58) Field of Classification Search
None
See application file for complete search history.

(56) References Cited

U.S. PATENT DOCUMENTS

| | | | |
|---|---|---|---|
| 6,428,444 B1 * | 8/2002 | Tabata | 477/3 |
| 7,052,430 B2 * | 5/2006 | Stevenson et al. | 475/278 |
| 7,163,484 B2 | 1/2007 | Klemen | |
| 7,549,943 B2 * | 6/2009 | Gumpoltsberger | 475/284 |
| 7,846,051 B2 * | 12/2010 | Holmes et al. | 475/5 |
| 2003/0035734 A1 * | 2/2003 | Vukovich et al. | 417/223 |
| 2005/0079945 A1 * | 4/2005 | Wittkopp | 475/271 |
| 2006/0116231 A1 * | 6/2006 | Supina et al. | 475/8 |
| 2006/0270513 A1 | 11/2006 | Klemen | |
| 2006/0270516 A1 * | 11/2006 | Klemen | 475/280 |
| 2013/0072339 A1 * | 3/2013 | Zhang | 475/159 |

* cited by examiner

*Primary Examiner* — Gene Crawford
*Assistant Examiner* — Mark Manley

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

19 Claims, 1 Drawing Sheet

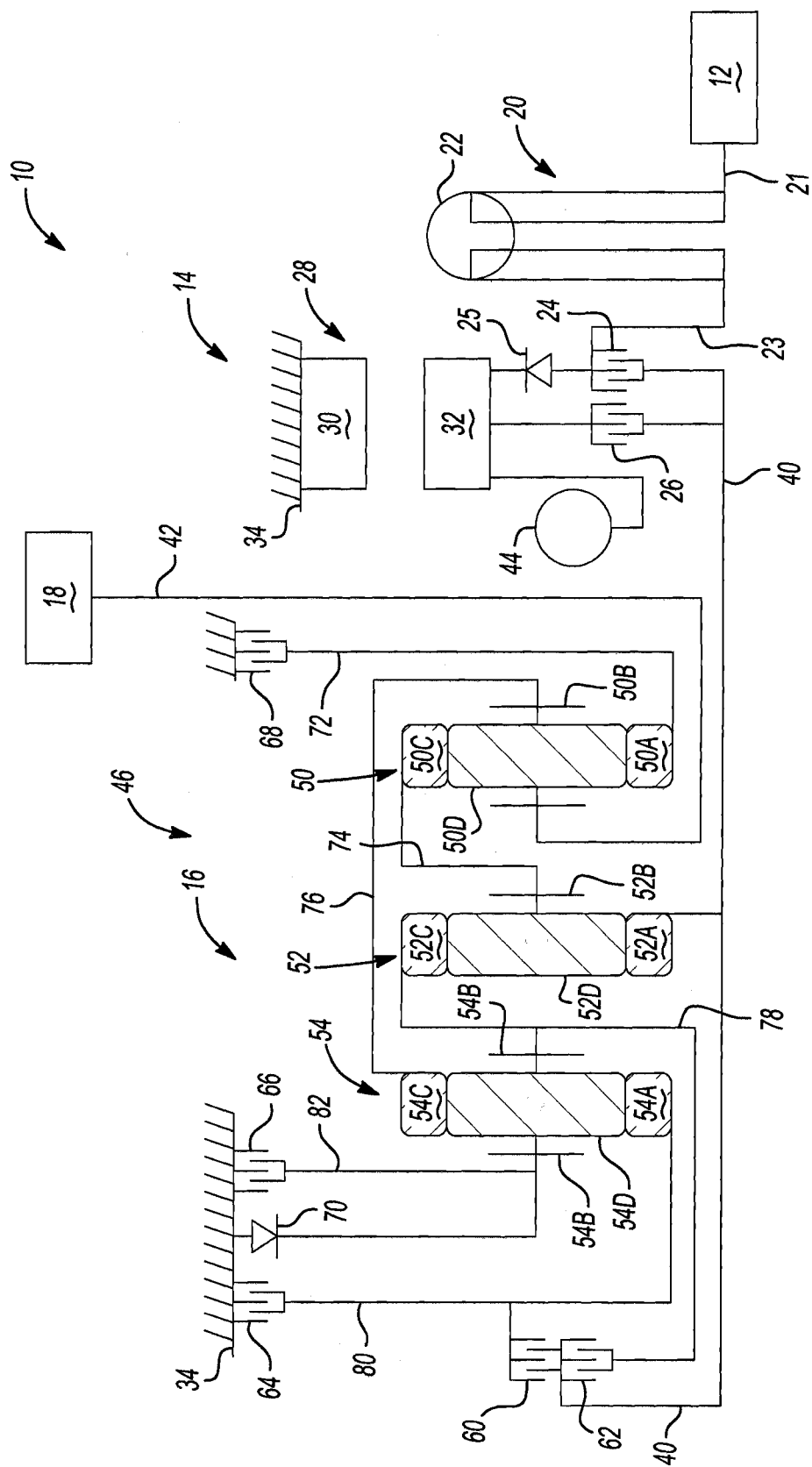

HYBRID POWERTRAIN FOR A MOTOR VEHICLE

CROSS REFERENCE TO RELATED APPLICATION

This application claims the benefit of U.S. Provisional Patent Application Ser. No. 61/432,139, filed Jan. 12, 2011, which is hereby incorporated in its entirety herein by reference.

FIELD

The present disclosure relates to a hybrid powertrain for a motor vehicle and more particularly to a torque transfer device for a transmission having an electric motor coupled to an input shaft of the transmission.

BACKGROUND

The statements in this section merely provide background information related to the present disclosure and may or may not constitute prior art.

Extensive engineering and design effort is currently directed to hybrid powertrains for motor vehicles, especially passenger cars. One of the most promising and active areas involves the addition of an electric motor and associated electronic controller to a motor vehicle powertrain to supplement torque for launches in order that a smaller internal combustion engine may be utilized in the vehicle. Lower horsepower and smaller displacement engines routinely provide improved fuel economy over larger engines and, when supplemented by an electric motor for vehicle launch, provide entirely satisfactory overall performance.

Accordingly, many hybrid powertrains begin as adaptations of conventional and existing powertrains utilizing an internal combustion engine and a transmission having a torque converter and multiple planetary gear assemblies. Into this powertrain is added an electric motor and an appropriate launch and disconnect clutch. Frequently, the torque converter is removed. The addition is not without significant challenges, however, as such constraints as axial length, housing outside diameter, clutch actuation, clutch cooling and integration into the existing powertrain components must be addressed and resolved.

The present invention is directed to a hybrid powertrain which addresses and solves the above-delineated challenges.

SUMMARY

In one aspect of the present invention, a powertrain includes an engine and an electric motor module that supplies a driving torque to a transmission. The transmission supplies various gear or speed ratios to a final drive unit. The engine supplies a driving torque to a flywheel. Flywheel includes a damper. The electric motor module includes a coast clutch, a one-way clutch, a launch clutch and an electric motor. The flywheel is connected or coupled to the coast clutch and to the one-way clutch of the electric motor module. The one-way clutch is further connected or coupled to the electric motor and allows torque to be transmitted from the flywheel to the electric motor, but not from the electric motor to the flywheel.

In another aspect of the present invention, the electric motor generally includes a stator and a rotor. The stator includes a plurality of windings or phases and is secured to a transmission housing. The rotor is disposed radially inwardly of the stator. The rotor of the electric motor is interconnected to the one-way clutch, the launch clutch and to a hydraulic pump.

In another aspect of the present invention, when the coast clutch and the launch clutch are not engaged or are in a disconnected state the pump may be driven independently of the engine speed. Further, when the engine speed exceeds the rotor speed the one-way clutch is activated and drives the pump through the rotor.

In yet another aspect of the present invention, the transmission is driven by a flywheel connected to an output of an engine. The transmission includes an input member, an output member, first, second, and third planetary gear sets each having a sun gear, a carrier member and a ring gear, interconnecting members or shaft/hub structures, an electric motor, four clutches, three brakes, two one-way clutches and a hydraulic pump.

In yet another aspect of the present invention, the first interconnecting member continuously interconnects the ring gear of the first planetary gear set with the carrier member of the second planetary gear set.

In yet another aspect of the present invention, the second interconnecting member continuously interconnects the carrier member of the first planetary gear set and the output member with the ring gear of the third planetary gear set.

In yet another aspect of the present invention, the third interconnecting member continuously interconnects the ring gear of the second planetary gear set with the carrier member of the third planetary gear set.

In yet another aspect of the present invention, the electric motor has a rotor and a stator. The stator is coupled to a transmission housing and the rotor is selectively interconnected with the sun gear of the second planetary gear set.

In yet another aspect of the present invention, the first clutch is selectively engageable to interconnect the flywheel connected to the engine output with the input member and the sun gear of the second planetary gear set.

In yet another aspect of the present invention, the second clutch is selectively engageable to interconnect the rotor of the electric motor with the sun gear of the second planetary gear set.

In yet another aspect of the present invention, the third clutch is selectively engageable to interconnect the sun gear of the second planetary gear set with the sun gear of the third planetary gear set.

In yet another aspect of the present invention, the fourth clutch is selectively engageable to interconnect the sun gear of the second planetary gear set with the ring gear of the second planetary gear set and the carrier member of the third planetary gear set.

In yet another aspect of the present invention, the first brake is selectively engageable to interconnect the sun gear of the third planetary gear set with a stationary member.

In yet another aspect of the present invention, the second brake is selectively engageable to interconnect the ring gear of the second planetary gear set and the carrier member of the third planetary gear set with the stationary member.

In yet another aspect of the present invention, the third brake is selectively engageable to interconnect the sun gear of the first planetary gear set with the stationary member.

In yet another aspect of the present invention, the first one-way clutch selectively interconnects the ring gear of the second planetary gear set and the carrier member of the third planetary gear set with the stationary member.

In yet another aspect of the present invention, the second one-way clutch is interconnected between the rotor of the electric motor and the engine for allowing torque to transfer from the engine to the rotor of the electric motor and preventing torque from transferring from the rotor of the electric motor to the engine.

In yet another aspect of the present invention, the hydraulic pump is continuously interconnected and driven by the rotor of the electric motor.

In yet another aspect of the present invention, the torque transmitting mechanisms are selectively engageable to establish a plurality of forward speed ratios and at least one reverse speed ratio between the input member and the output member.

Further aspects, advantages and areas of applicability will become apparent from the description provided herein. It should be understood that the description and specific examples are intended for purposes of illustration only and are not intended to limit the scope of the present disclosure.

DRAWINGS

The drawing described herein is for illustration purposes only and is not intended to limit the scope of the present disclosure in any way.

FIG. 1 is a diagrammatic view of an embodiment of a hybrid powertrain including a six speed transmission.

DETAILED DESCRIPTION

The following description is merely exemplary in nature and is not intended to limit the present disclosure, application, or uses.

With reference to FIG. 1, an exemplary powertrain for a motor vehicle is generally indicated by reference number 10. The powertrain 10 includes an engine 12 and an electric motor module 14 that supplies a driving torque to a transmission 16 which supplies various gear or speed ratios to a final drive unit 18. The engine 12 may be a conventional internal combustion engine or an electric engine, or any other type of prime mover, without departing from the scope of the present disclosure. More specifically, the engine 12 supplies a driving torque to a flywheel, isolator or other connecting device 20 through a shaft or member 21. Flywheel 20 includes a damper 22 and is coupled to the electric motor module 14 through a shaft or member 23. The damper 22 is configured to absorb a portion of torque oscillations generated by the engine 12 and transmitted through shaft or member 21 to the flywheel 20. The damper 22 may take various forms and have various properties without departing from the scope of the present disclosure, for example, damper 22 and flywheel 20 are combined to form a dual mass flywheel.

The electric motor module 14 includes a coast clutch 24, a one-way clutch 25, a launch clutch 26 and an electric motor 28. The coast clutch 24 and launch clutch 26 are, in the example provided, plate clutches. However, it should be appreciated that various types of torque transmitting devices may be employed. The flywheel 20 is connected or coupled to the coast clutch 24 and to the one-way clutch 25 of the electric motor module 14. The one-way clutch 25 is further connected or coupled to the electric motor 28 and allows torque to be transmitted from the flywheel 20 to the electric motor 28, but not from the electric motor 28 to the flywheel 20. Thus, when the coast clutch 24 is applied or engaged torque is transmitted from the flywheel 20 to the transmission input shaft 40 and when the launch clutch 26 is applied or engaged torque is transmitted from the electric motor 28 to the transmission input shaft 40.

The electric motor 28 generally includes a stator 30 and a rotor 32. The stator 30 includes a plurality of windings or phases and is secured to a ground, stationary member or a transmission housing 34. The rotor 32 includes a plurality of magnets and/or ferromagnetic members and is disposed radially inwardly of the stator 30. The rotor 32 of the electric motor 28 is interconnected to the one-way clutch 25, the launch clutch 26 and to a hydraulic pump 44. The stator 30 and the rotor 32 may take various forms and have various properties without departing from the scope of the present disclosure. In operation, when the coast clutch 24 and the launch clutch 26 are not engaged or are in a disconnected state, the pump may be driven independently of the engine speed by the rotor 32 of the electric motor 28. Further, when the engine speed exceeds the rotor speed the one-way clutch 25 is activated and the pump 44 is driven by the engine 12.

Advantageously, during regenerative braking conditions, the coast clutch 24 is disengaged (while keeping the launch clutch 26 is applied or engaged) to allow the rotor 32 to accept full coast torque. If engine braking is needed the coast clutch 24 is applied or engaged to drive the engine 12. Additionally, flying starts or when the vehicle is moving engine starts are accomplished by engaging the coast clutch 24. Moreover, the arrangement of the present invention using the coast clutch 24, the launch clutch 26 and a one-way clutch 25 are provided to eliminate the need for an auxiliary pump.

The transmission 16 generally includes the transmission input shaft 40, a transmission output shaft 42, a pump 44, and a clutch and gear arrangement 46. The transmission input shaft 40 is connected for common rotation with and is selectively driven by both the coast clutch 24 and the launch clutch 26. As stated above, the pump 44 is connected to and driven by the rotor 32 of the electric motor 28. The pump 44 may be any positive displacement pump, such as a gerotor pump or a vane pump, operable to provide pressurized hydraulic fluid to both the transmission 16 and the electric motor module 14.

The gear and clutch arrangement 46 includes a plurality of planetary gear assemblies 50, 52, and 54 interconnected with a plurality of torque transmitting mechanisms 60, 62, 64, 66, 68, and 70. For example, the first planetary gear set 50 includes a sun gear member 50A, a planet gear carrier member 50B and a ring gear member 50C. The sun gear member 50A is connected for common rotation with a first shaft or interconnecting member 72. The ring gear member 50C is connected for common rotation with a second shaft or interconnecting member 74. The planet gear carrier member 50B rotatably supports a set of planet gears 50D (only one of which is shown) and is connected for common rotation with the transmission output shaft or member 42 and a third shaft or interconnecting member 76. The planet gears 50D are each configured to intermesh with both the sun gear member 50A and the ring gear member 50C.

The second planetary gear set 52 includes a sun gear member 52A, a planet carrier member 52B that rotatably supports a set of planet gears 52D and a ring gear member 52C. The sun gear member 52A is connected for common rotation with the transmission input shaft or member 40. The ring gear member 52C is connected for common rotation with a fourth shaft or interconnecting member 78. The planet carrier member 52B is connected for common rotation with the second shaft or interconnecting member 74. The planet gears 52D are each configured to intermesh with both the sun gear member 52A and the ring gear member 52C.

The third planetary gear set 54 includes a sun gear member 54A, a ring gear member 54C and a planet carrier member 54B that rotatably supports a set of planet gears 54D. The sun gear member 54A is connected for common rotation with a fifth shaft or interconnecting member 80. The ring gear member 54C is connected for common rotation with the third shaft or interconnecting member 76. The planet carrier member 54B is connected for common rotation with the fourth shaft or interconnecting member 78 and a sixth shaft or interconnecting member 82. The planet gears 54D are each configured to intermesh with both the sun gear member 54A and the ring gear member 54C.

The torque-transmitting mechanisms or clutches 60, 62 and brakes 64, 66, 68, 70 allow for selective interconnection of the shafts or interconnecting members, members of the planetary gear sets and the transmission housing. For example, the first clutch 60 is selectively engageable to connect the fifth interconnecting member 80 with the transmission input member 40. The second clutch 62 is selectively engageable to connect the fourth interconnecting member 78 with the transmission input member 40. The first brake 64 is selectively engageable to connect the fifth interconnecting member 80 to the stationary member or transmission housing 34 in order to restrict the member 80 from rotating relative to the stationary member or transmission housing 34. The second brake 66 is selectively engageable to connect the sixth interconnecting member 82 to the stationary member or transmission housing 34 in order to restrict the member 82 from rotating relative to the stationary member or transmission housing 34. The third brake 68 is selectively engageable to connect the first interconnecting member 72 to the stationary member or transmission housing 34 in order to restrict the member 72 from rotating relative to the stationary member or transmission housing 34. The fourth brake 70 is a one-way clutch that is selectively engageable to connect the sixth interconnecting member 82 to the stationary member or transmission housing 34 in order to restrict the member 82 from rotating relative to the stationary element or transmission housing 34 in a first rotational direction.

The transmission output shaft or member 42 is preferably continuously connected with the final drive unit or transfer case 18. The final drive unit 18 may include a differential, trans-axles, and wheels (not shown) for providing a final output torque.

The description of the invention is merely exemplary in nature and variations that do not depart from the gist of the invention are intended to be within the scope of the invention. Such variations are not to be regarded as a departure from the spirit and scope of the invention.

The invention claimed is:

1. A hybrid powertrain having a transmission selectively driven by an engine, the hybrid powertrain comprising:
   an input member;
   an output member;
   first, second, and third planetary gear sets each having first, second and third members;
   a first interconnecting member continuously interconnecting the third member of the first planetary gear set with the second member of the second planetary gear set;
   a second interconnecting member directly continuously interconnecting the second member of the first planetary gear set and the output member with the third member of the third planetary gear set;
   a third interconnecting member continuously interconnecting the third member of the second planetary gear set with the second member of the third planetary gear set;
   six torque transmitting mechanisms each selectively engageable to interconnect at least one of the first, second, and third members with at least another of the first, second, third members and a stationary member;
   an electric motor selectively interconnected with the first member of the second planetary gear set;
   a first clutch for selectively interconnecting the engine with the input member;
   a second clutch for selectively interconnecting the electric motor with the input member;
   a hydraulic pump continuously interconnected with the electric motor;
   a one-way clutch interconnected between the electric motor and the engine for allowing torque to transfer from the engine to the electric motor and preventing torque from transferring from the electric motor to the engine, and
   wherein the torque transmitting mechanisms are selectively engageable to establish a plurality of forward speed ratios and at least one reverse speed ratio between the input member and the output member.

2. The hybrid powertrain of claim 1 wherein a first of the six torque transmitting mechanisms is selectively engageable to interconnect the first member of the second planetary gear set with the first member of the third planetary gear set.

3. The hybrid powertrain of claim 2 wherein a second of the six torque transmitting mechanisms is selectively engageable to interconnect the first member of the second planetary gear set with the third member of the second planetary gear set and the second member of the third planetary gear set.

4. The hybrid powertrain of claim 3 wherein a third of the six torque transmitting mechanisms is selectively engageable to interconnect the first member of the third planetary gear set with the stationary member.

5. The hybrid powertrain of claim 4 wherein a fourth of the six torque transmitting mechanisms is selectively engageable to interconnect the third member of the second planetary gear set and the second member of the third planetary gear set with the stationary member.

6. The hybrid powertrain of claim 5 wherein a fifth of the six torque transmitting mechanisms is selectively engageable to interconnect the first member of the first planetary gear set with the stationary member.

7. The hybrid powertrain of claim 6 wherein a sixth of the six torque transmitting mechanisms is selectively engageable to interconnect the third member of the second planetary gear set and the second member of the third planetary gear set with the stationary member.

8. The hybrid powertrain of claim 7 wherein the first member of the first planetary gear set, the first member of the second planetary gear set and the first member of the third planetary gear set are sun gears, the second members of the first, second and third planetary gear sets are carrier members and the third member of the first planetary gear set, the third member of the second planetary gear set and the third member of the third planetary gear set are ring gears.

9. The hybrid powertrain of claim 1 wherein the electric motor has a stator connected to the stationary member and a rotor selectively coupled to the first member of the second planetary gear set.

10. The hybrid powertrain of claim 9 wherein the hydraulic pump is continuously interconnected with the rotor of the electric motor.

11. The hybrid powertrain of claim 1 further comprising a flywheel continuously interconnected with the engine, the one-way clutch and the first clutch for suppressing vibrations in an output shaft of the engine.

12. The hybrid powertrain of claim 11 wherein the flywheel is a dual mass flywheel.

13. A transmission driven by a flywheel connected to an output of an engine, the transmission comprising:
   an input member;
   an output member;

first, second, and third planetary gear sets each having first, second and third members;

a first interconnecting member continuously interconnecting the third member of the first planetary gear set with the second member of the second planetary gear set;

a second interconnecting member directly continuously interconnecting the second member of the first planetary gear set and the output member with the third member of the third planetary gear set;

a third interconnecting member continuously interconnecting the third member of the second planetary gear set with the second member of the third planetary gear set;

an electric motor selectively interconnected with the first member of the second planetary gear set;

a first clutch selectively engageable to interconnect the flywheel connected to the engine output with the input member and the first member of the second planetary gear set;

a second clutch selectively engageable to interconnect the electric motor with the first member of the second planetary gear set;

a third clutch selectively engageable to interconnect the first member of the second planetary gear set with the first member of the third planetary gear set;

a fourth clutch selectively engageable to interconnect the first member of the second planetary gear set with the third member of the second planetary gear set and the second member of the third planetary gear set;

a first brake selectively engageable to interconnect the first member of the third planetary gear set with a stationary member;

a second brake selectively engageable to interconnect the third member of the second planetary gear set and the second member of the third planetary gear set with the stationary member;

a third brake selectively engageable to interconnect the first member of the first planetary gear set with the stationary member;

a first one-way clutch for selectively interconnecting the third member of the second planetary gear set and the second member of the third planetary gear set with the stationary member;

a second one-way clutch interconnected between the electric motor and the engine for allowing torque to transfer from the engine to the electric motor and preventing torque from transferring from the electric motor to the engine; and a hydraulic pump continuously interconnected and driven by the electric motor, and wherein the torque transmitting mechanisms are selectively engageable to establish a plurality of forward speed ratios and at least one reverse speed ratio between the input member and the output member.

14. The transmission of claim 13 wherein the first member of the first planetary gear set, the first member of the second planetary gear set and the first member of the third planetary gear set are sun gears, the second members of the first, second and third planetary gear sets are carrier members and the third member of the first planetary gear set, the third member of the second planetary gear set and the third member of the third planetary gear set are ring gears.

15. The transmission of claim 13 wherein the electric motor has a stator connected to the stationary member and a rotor coupled to the hydraulic pump, second clutch and the second one-way clutch.

16. A transmission driven by a flywheel connected to an output of an engine, the transmission comprising:

an input member;

an output member;

first, second, and third planetary gear sets each having a sun gear, a carrier member and a ring gear;

a first interconnecting member continuously interconnecting the ring gear of the first planetary gear set with the carrier member of the second planetary gear set;

a second interconnecting member directly continuously interconnecting the carrier member of the first planetary gear set and the output member with the ring gear of the third planetary gear set;

a third interconnecting member continuously interconnecting the ring gear of the second planetary gear set with the carrier member of the third planetary gear set;

an electric motor having a rotor and a stator, wherein the stator is coupled to a transmission housing and the rotor is selectively interconnected with the sun gear of the second planetary gear set;

a first clutch selectively engageable to interconnect the flywheel connected to the engine output with the input member and the sun gear of the second planetary gear set;

a second clutch selectively engageable to interconnect the rotor of the electric motor with the sun gear of the second planetary gear set;

a third clutch selectively engageable to interconnect the sun gear of the second planetary gear set with the sun gear of the third planetary gear set;

a fourth clutch selectively engageable to interconnect the sun gear of the second planetary gear set with the ring gear of the second planetary gear set and the carrier member of the third planetary gear set;

a first brake selectively engageable to interconnect the sun gear of the third planetary gear set with a stationary member;

a second brake selectively engageable to interconnect the ring gear of the second planetary gear set and the carrier member of the third planetary gear set with the stationary member;

a third brake selectively engageable to interconnect the sun gear of the first planetary gear set with the stationary member;

a first one-way clutch for selectively interconnecting the ring gear of the second planetary gear set and the carrier member of the third planetary gear set with the stationary member;

a second one-way clutch interconnected between the rotor of the electric motor and the engine for allowing torque to transfer from the engine to the rotor of the electric motor and preventing torque from transferring from the rotor of the electric motor to the engine; and a hydraulic pump continuously interconnected and driven by the rotor of the electric motor, and wherein the torque transmitting mechanisms are selectively engageable to establish a plurality of forward speed ratios and at least one reverse speed ratio between the input member and the output member.

17. The hybrid powertrain of claim 1 wherein the interconnecting members are shafts.

18. The transmission of claim 13 wherein the interconnecting members are shafts.

19. The transmission of claim 16 wherein the interconnecting members are shafts.

* * * * *